United States Patent
Lazar

(10) Patent No.: US 12,468,861 B2
(45) Date of Patent: Nov. 11, 2025

(54) DATA STORAGE SYSTEM USING SELECTIVE ENCRYPTION BASED ON PORT BINDING IN COMMUNICATIONS WITH DRIVE SUBSYSTEM

(71) Applicant: Dell Products L.P., Round Rock, TX (US)

(72) Inventor: Gregory W. Lazar, Upton, MA (US)

(73) Assignee: Dell Products L.P., Round Rock, TX (US)

( * ) Notice: Subject to any disclaimer, the term of this patent is extended or adjusted under 35 U.S.C. 154(b) by 330 days.

(21) Appl. No.: 18/133,736

(22) Filed: Apr. 12, 2023

(65) Prior Publication Data

US 2024/0346186 A1 Oct. 17, 2024

(51) Int. Cl.
*G06F 21/78* (2013.01)
*G06F 21/60* (2013.01)
*G06F 21/85* (2013.01)

(52) U.S. Cl.
CPC ............ *G06F 21/78* (2013.01); *G06F 21/602* (2013.01); *G06F 21/85* (2013.01)

(58) Field of Classification Search
CPC ........ G06F 21/78; G06F 21/602; G06F 21/85; G06F 21/6218
See application file for complete search history.

(56) References Cited

U.S. PATENT DOCUMENTS

| | | | |
|---|---|---|---|
| 7,069,447 B1 | 6/2006 | Corder | |
| 9,471,805 B2 | 10/2016 | Fisher et al. | |
| 11,729,181 B2* | 8/2023 | Zimmerman | H04L 63/0485 |
| | | | 726/2 |
| 2010/0322417 A1* | 12/2010 | Altmann | H04N 21/4122 |
| | | | 380/42 |
| 2017/0093955 A1* | 3/2017 | Evans | H04L 63/0823 |
| 2019/0042474 A1* | 2/2019 | Edirisooriya | G06F 3/0634 |
| 2020/0143040 A1* | 5/2020 | Sutton | G06F 3/067 |
| 2020/0233970 A1* | 7/2020 | Rooks | G06F 21/602 |

* cited by examiner

*Primary Examiner* — Lesa M Kennedy
(74) *Attorney, Agent, or Firm* — BainwoodHuang

(57) ABSTRACT

A drive subsystem engages in data communication with a storage controller by establishing logic for selectively decrypting data communications based on identification of a controller encryption port as source port in received data communications. Data communications from the storage controller are processed by (1) for data commands, based on a non-encrypting port being identified as the source port, delivering the received data commands without decryption to the target drive, and (2) for a security command containing secret data enabling operation of the target drive, based on the controller encryption port being identified as the source port, decrypting the security command and delivering the decrypted security command to the target drive.

20 Claims, 3 Drawing Sheets

DATA STORAGE SYSTEM USING SELECTIVE ENCRYPTION BASED ON PORT BINDING IN COMMUNICATIONS WITH DRIVE SUBSYSTEM

BACKGROUND

The invention relates to the field of data storage, and in particular to data storage systems employing self-encrypted drives.

SUMMARY

In one aspect, a method is disclosed by which a drive subsystem engages in data communication with a storage controller. The method includes, by the drive subsystem, establishing logic for selectively decrypting data communications from the storage controller based on identification of a controller encryption port as source port in received data communications. The data communications from the storage controller are received and processed based on identification of source port, by (1) for data commands by which the storage controller stores and retrieves data to/from a target drive of the drive subsystem, receiving the data commands in non-encrypted form and, based on a non-encrypting port being identified as the source port, delivering the received data commands without decryption to the target drive, and (2) for a security command containing secret data enabling operation of the target drive, receiving the security command in encrypted form and, based on the controller encryption port being identified as the source port, decrypting the security command and delivering the decrypted security command to the target drive.

In another aspect, a method is disclosed by which storage controller engages in data communication with a drive subsystem. The method includes, by the storage controller, establishing a first port and a second port for transmitting data communications to the drive subsystem, the first port being a non-encrypting port configured for transmitting non-encrypted data communications to the drive subsystem, the second port being a controller encryption port configured for encrypting outgoing data communications and transmitting encrypted data communications to the drive subsystem. The data communications are transmitted to a destination port of the drive subsystem with selective encryption and identification of source port, by (1) for data commands by which the storage controller stores and retrieves data to/from a target drive of the drive subsystem, transmitting the data commands in non-encrypted form with an indication of the non-encrypting port as the source port, and (2) for a security command containing secret data enabling operation of the target drive, transmitting the security command in encrypted form with an indication of the controller encryption port as the source port.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
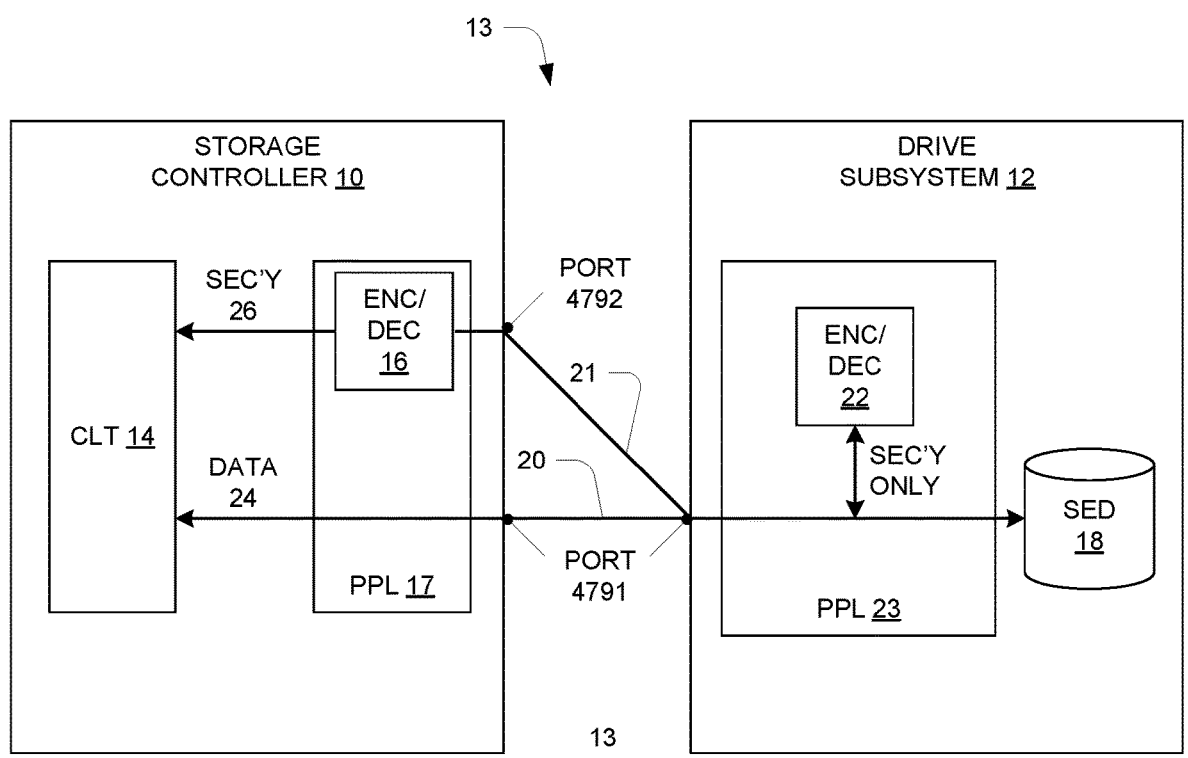
FIG. 1 is a block diagram of a data storage system having a data storage controller communicatively coupled to a drive subsystem.

The present description is directed to systems employing encryption of stored data, or "data at rest" encryption, such as provided in one example by self-encrypting disk drives. In particular, it is directed to secure communication of passphrases between a "host" (such as a storage controller) and a self-encrypted drive that uses the passphrase to unlock itself for operation. The application is described in a specific operating environment, but those skilled in the art will appreciate that the technique may be used in other specific environments, some of which may be identified below.

The NVMe over Fabric (NVMe-OF) is a network protocol used to communicate between a storage controller and a drive subsystem over a fabric/network. This can either be a private network, or possibly an open network (threats are magnified in this case) where the drive subsystem is a shared resource between hosts. When the drives (storage devices) in the drive subsystem are self-encrypting, and are configured to start in a "locked" state, it requires that the host "unlock" them in order to access the data they store. A unique passphrase is configured on each drive in the drive subsystem, that must be provided by the host to unlock the drive. A passphrase is sent by the host using the NVMe-oF Security Send command (security send 0x81), and the drive subsystem responds with a Security Receive command (Security Receive 0x82). If a passphrase is intercepted by an attacker on the network connecting the host and drive subsystem, and the corresponding self-encrypting drive subsequently stolen (which is the primary threat that data-at-rest encryption solutions protect against), the entire contents of the drive could be read and processed offline. This only requires that a small amount of network data be captured (one Security Send command, possibly on host startup), to facilitate obtaining the contents of the entire drive, and possibly multiple drives. Once the drive and passphrase are in the attacker's possession, the entire contents of the drive can be processed to obtain unauthorized access to the stored data.

Thus, it is desired to protect the communications between the host and drive subsystem, especially the passphrase, to protect against unauthorized access to the data of the self-encrypting drive.

Standard encryption functionality known as IP Security (IPsec) can be used to protect the NVMe-oF traffic (control and data) exchanged between a host and a drive subsystem. However, in situations where there isn't adequate hardware acceleration, overall performance (i.e., latency and bandwidth) may be significantly degraded. In Virtual deployments as an example, there is no hardware guarantee.

Other approaches to this problem either require code changes to BOTH the host and storage array kernel, that require either listening explicitly on an alternate port for all targets, in the backend NVMe-oF implementation itself. This can lead to maintenance issues for the implementation, when taking new code changes (new kernel).

In a disclosed approach, a system performs encryption for only the security commands, which provides desired protection with limited performance impact. It is also done in a way that provides for compatibility with existing code base (e.g., open-source implementation of self-encrypting drives).

On the client (storage controller) side, a second UDP port (e.g., port 4792) is used strictly for security send commands, as opposed to the port used for regular data commands (e.g., standard port 4791). The drive subsystem uses only the standard port. On both the host and storage, IPsec rules are put in place to protect traffic with the Encapsulating Security Payload (ESP) protocol only on the second client port (i.e., 4792). For any security send commands, the client binds to the second port, which triggers IPsec to protect this traffic. Other traffic including regular data traffic (reads and writes) simply passes through via the standard (non-encrypting) port, so a desired performance profile is maintained. An example, based on strongSwan IPSEC management software is given to illustrate the approach.

With minimal changes to host software and storage array configuration, the goal of securing the sensitive Self Encrypting Drive passphrases is achieved, while still maintaining the required level of I/O performance, notwithstanding the unavailability of IPsec hardware acceleration.

EMBODIMENTS

FIG. 1 is a simplified block diagram of a data storage system including a storage controller 10 connected to a drive subsystem 12. The connection 13 may generally be of a variety of types, and may utilize a multi-layer architecture such as generally known. In one embodiment, the connection utilizes so-called NVM Express Over Fiber (NVMe-OF) protocol running over one or more lower layers. In a further embodiment, a transport layer known as RDMA Over Converged Ethernet (ROCE) is used, which further relies upon the User Datagram Protocol (UDP) for stateless datagram transmission. At the UDP level, the connection 13 provides for datagram transmission using two separate pairs of ports between the two subsystems 10, 12, i.e., a first pair 20 (e.g., ports 4791-4791) and a second pair 21 (e.g., ports 4792-4791) as shown. Details are discussed further below. The present description uses the term "port" both generically, i.e., a source or destination for communications (e.g., datagrams or packets), and specifically for the UDP context, i.e., a UDP port as generally known.

The storage controller 10 provides data storage services to separate host computers (or hosts, not shown), relying on the drive subsystem 12 for the underlying physical data storage. For purposes of this description, the main functional logic of the storage controller 10 involved with storing and retrieving data is shown in simplified form as a client (CLT) 14. The storage controller 10 also includes encryption/decryption logic (ENC/DEC) 16, which is explained more below. For ease of reference, this logic 16 is also referred to herein as simply "encryption" logic. In one embodiment, both the client 14 and encryption logic 16 are software-implemented, i.e., they are realized by computer processing hardware executing special-purpose client and encryption software, respectively. The encryption logic 16 is part of more general port processing logic (PPL) 17 used by the storage controller 10 to handle data communications with the drive subsystem 12. In one embodiment, the storage controller 10 may be based on the PowerStore® product family of Dell Technologies, Inc.

The drive subsystem 12 includes an array of self-encrypting disks (SEDs), represented in FIG. 1 by one SED 18. For simplicity, the present description generally refers to the SED 18 in the singular, but it will be understood that the description generally applies to all the SEDs of the drive subsystem 12, with individuation as appropriate. The drive subsystem 12 also includes encryption/decryption (ENC/DEC) logic 22, which is also referred to herein as simply "encryption" logic. The encryption logic 22 is part of more general port processing logic (PPL) 23 used by the storage controller 10 to handle data communications with the drive subsystem 12. In some embodiments the drive subsystem 12 may be referred to as a "disk array" or "disk array enclosure".

In one embodiment the SED 18 is realized using Flash-programmable read-only memory, generally referred to as "Flash". The term "self-encrypting" refers to internal functionality by which the SED 18 stores data in encrypted form (i.e., data-at-rest), thus protecting the data from exposure if the SED 18 should be stolen or otherwise obtained by an unauthorized party. This encryption functionality is internal to the SED 18 and separate from the communications encryption provided by logics 16 and 22, which is described more below. In normal operation, the client 14 exchanges data 24 with the drive subsystem 12 in clear, unencrypted form. When data 24 is being stored, it is first encrypted within the SED 18 and then stored persistently, e.g., in a Flash array. When stored data is read, the SED 18 reads the encrypted data from the persistent storage, decrypts it, and returns it the requestor as unencrypted data 24. Self-encrypting drives are normally implemented in a manner that even if an attacker obtains physical access to the drive, they cannot decrypt the stored data (i.e., the encryption keys are either stored separately or are stored in a hardened manner and thus not accessible).

Also shown in FIG. 1 are the two port pairs 20, 21 between the storage controller 10 and the drive subsystem 12. Generally these are realized using "ports" such as UDP ports as explained above, which in this specific example are indicated by the two port numbers 4791 and 4792. One pair 20 is between controller port 4791 and drive subsystem port 4791, and another pair 21 is between controller port 4792 and drive subsystem port 4791. The pair 20 is used to carry the data 24 in unencrypted form. The pair 21 is used to carry other commands and responses, referred to as security commands/responses (SEC'Y) 26, in encrypted form through use of the encryption logics 16, 22. In one embodiment, this communications encryption is provided using so-called IP Security (IPsec) protocol and functionality, which is a user-configurable feature in Internet Protocol (IP) environments. Additional details are provided below. Those skilled in the art will appreciate that other specific ports may be used. In particular, on the storage controller 10 the non-encrypting port may be a port in the dynamic port range.

Within the drive subsystem 12, the port processing logic 23 is configured and operative to selectively employ the encryption/decryption functionality 22 to only the security commands 26, based on the controller port to/from which the communications is delivered/received. For communications received from controller port 4791 (pair 20), no decryption is performed, while decryption is performed for communications received from controller port 4792 (pair 21). For communications being sent to controller port 4791 (pair 20), no encryption is performed, while encryption is performed for communications being sent to controller port 4792 (pair 21). In one embodiment this selective encryption functionality can be provided by certain configuration operations, as also explained more below. This may involve the use of so-called "traffic selectors", which are known elements in an IPsec environment.

As previously mentioned, the presently disclosed technique finds special use in environments using SEDs or other types of encryption schemes for encrypted data-at-rest, to protect against data loss if an unauthorized party obtains access to a device on which the data is stored. Nonetheless, the technique may also find use in other environments in which data is stored in unencrypted form, for example. Additionally, the technique may be used in other contexts besides the accessing of back-end storage by a storage controller. In a general sense, the storage controller 10 may be viewed as simply an "initiator" of data storage operations to a separate subsystem (e.g., drive subsystem) in which the actual data is stored.

In operation, the client 14 communicates with the drive subsystem 12 for storing data and retrieving data to/from the SED 18, in generally known manner. In the context of self-encrypting drives, operation of the SED 18 is enabled only once the client 14 has provided a correct passphrase, which serves as a "key" (in the generic sense) to unlock operation. The client 14 communicates the passphrase to the SED 18 using a Security command 26 known as a Security Send command, and the SED 18 provides a response (generally indicating success or failure of the passphrase part of operation) in another Security command 26 known as a Security Response command. Once the SED 18 has been successfully unlocked through use of the correct passphrase, the client 14 then engages in regular data storage operations (data read and write operations) generally indicated as data 24. The SED 18 performs its internal encryption of data for storage and decryption of stored data for satisfying read accesses in the normal way, without exposing its internal encryption/decryption key(s).

In typical use, an SED such as SED 18 sends and receives all communications (data and security) through one internal connection point connected to Port 4791, which is the use shown in FIG. 1. As mentioned above, it would be possible to use either hardware or software IPsec encryption for all Port-4791 communications between the two systems 10 and 12, in which case only a Port-4791 connection would be needed and both the data and security commands (including passphrase) would be protected in transit between the two systems. However, for various reasons it may be undesirable to encrypt all communications, e.g., when hardware encryption is not available and the lower performance of software encryption cannot be tolerated. If none of the communications is protected, then there is risk that the passphrase could be intercepted by an unauthorized party with access to the communications, enabling that party to subsequently decrypt the encrypted data of the SED 18 in unauthorized manner. This risk is addressed in the illustrated arrangement by making only selective use of communications encryption, specifically for the Security commands 26. This helps protect against the above scenario of exposing a passphrase, but without incurring the presumably unacceptable performance hit from encrypting all communications including the data 24. Additionally, this selective encryption functionality is provided while still permitting the SED 18 to use only Port 4791 for all communications, providing backward compatibility with existing implementations of the SED 18 (e.g., open-source implementations) for example.

Thus, in one arrangement the disclosed technique involves use of a separate UDP port (4792) on the controller side as shown, which is used instead of the standard port 4791 for the Security commands 26 specifically. More generally, such a separate port is referred to as a "controller encryption port". On both the storage controller 10 and drive subsystem 12, IPsec rules are put in place to protect traffic with the Encapsulating Security Payload (ESP) protocol only on traffic using the controller encryption port as distinct from the data (standard) port. For Security Send commands, the client 14 binds to the encryption port 4792, and within the drive subsystem 12 these commands are decrypted (by logic 22) for delivery to the SED 18. IPsec protects the security-related traffic 26, while the data traffic 24 simply passes through directly, due to its use of the standard port 4791 at the controller 10. Assuming that only software IPsec encryption is available, this arrangement improves security while also achieving desired performance by avoiding software encryption of the data 24.

Operation is further described with reference to FIGS. 2 and 3, which illustrate operation of a drive subsystem (e.g., 12) and storage controller (e.g., 10) respectively. It will be understood that in operation these two sets of operations are occurring concurrently, so that the overall system functionality is provided by this co-operation of these two subsystems.

Figure 2:
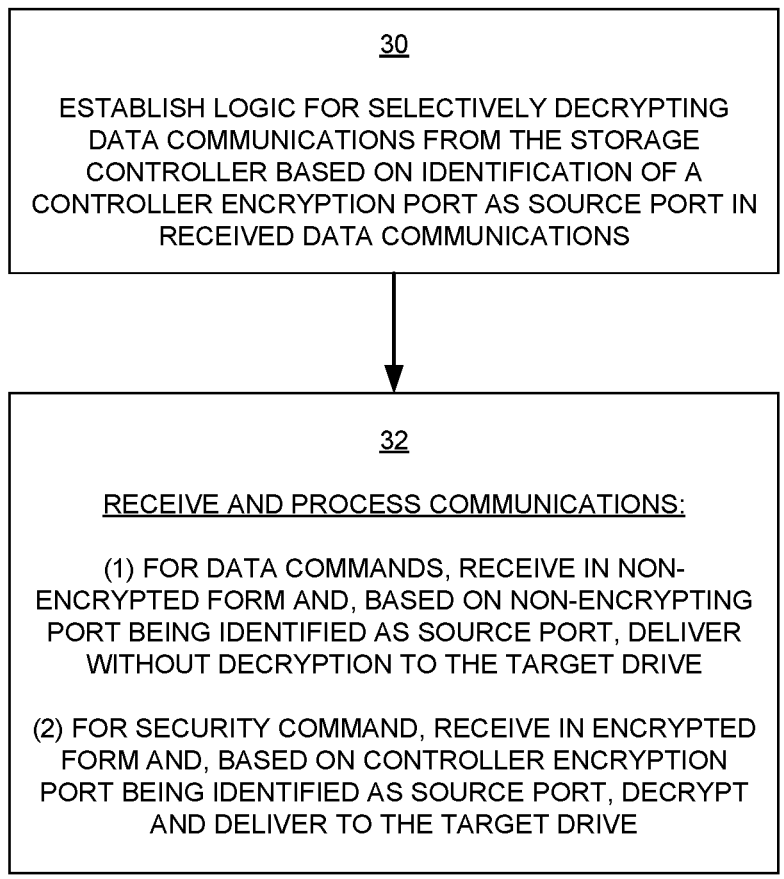
FIG. 2 is a flow diagram of operation of a drive subsystem.

Referring to FIG. 2, at 30 the drive subsystem (e.g., 12) establishes logic for selectively decrypting data communications from the storage controller based on identification of a controller encryption port as source port in received data communications. In one example this is realized using IPsec rules, as described more below.

At 32, the drive subsystem receives and processes the data communications from the storage controller based on identification of source port, by (1) for data commands by which the storage controller stores and retrieves data to/from a target drive of the drive subsystem (e.g., SED 18), receiving the data commands in non-encrypted form and, based on a non-encrypting port being identified as the source port, delivering the received data commands without decryption to the target drive, and (2) for a security command containing secret data enabling operation of the target drive (e.g., a Security Send command), receiving the security command in encrypted form and, based on the controller encryption port being identified as the source port, decrypting the security command and delivering the decrypted security command to the target drive.

Figure 3:
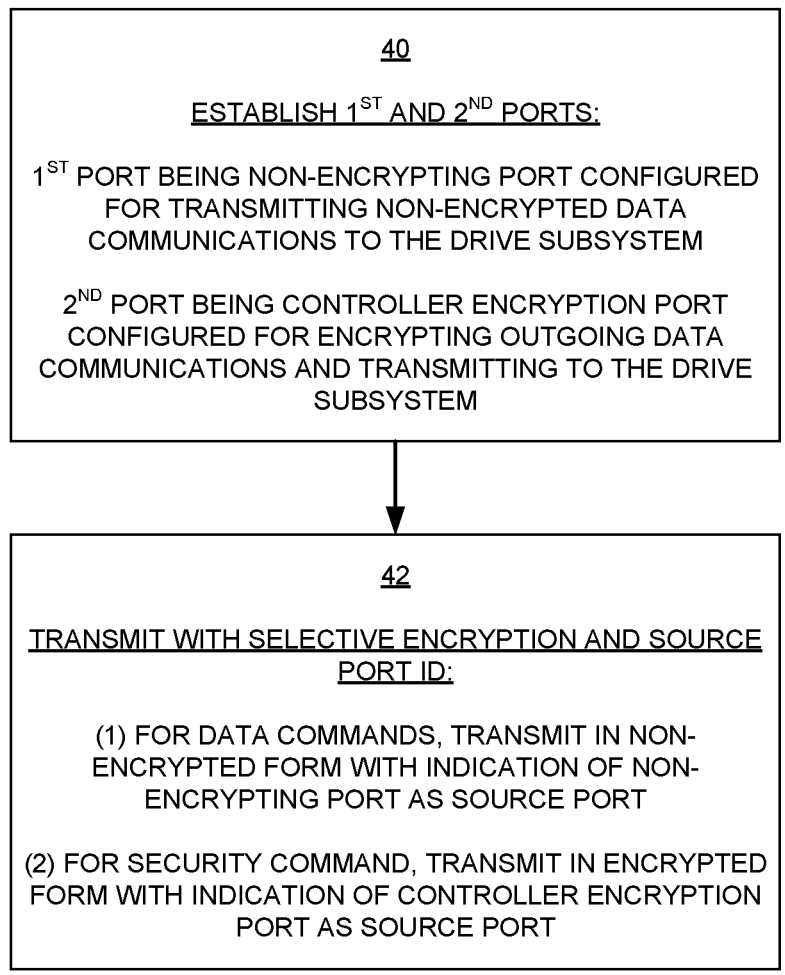
FIG. 3 is a flow diagram of operation of a storage controller.

Referring to FIG. 3, at 40 the storage controller (e.g., 10) establishes a first port and a second port for transmitting data communications to the drive subsystem. The first port is a non-encrypting port configured for transmitting non-encrypted data communications to the drive subsystem. The second port is a controller encryption port configured for encrypting outgoing data communications and transmitting encrypted data communications to the drive subsystem.

At 42, the storage controller transmits the data communications to a destination port of the drive subsystem with selective encryption and identification of source port, by (1) for data commands by which the storage controller stores and retrieves data to/from a target drive of the drive subsystem (e.g., SED 18), transmitting the data commands in non-encrypted form with an indication of the non-encrypting port as the source port, and (2) for a security command containing secret data enabling operation of the target drive (e.g., Security Send command), transmitting the security command in encrypted form with an indication of the controller encryption port as the source port.

In one example, the ports utilized are port 4792 for encrypted communications sent from storage controller, and port 4791 for non-encrypted communications sent from the storage controller. Those skilled in the art will appreciated that in general the port numbers per se are not critical and may be different.

As mentioned, one feature of the present technique is its use of run-time configuration to provide the desired arrangement (selective encryption) rather than requiring that the drive subsystem 12 have this functionality hard-coded, enabling the technique to be used in a backward-compatible manner with existing (e.g., open source) implementations. Such configuration may be achieved by a variety of generally known techniques. Establishing the ports in the manner described above may include adding corresponding rules to the port-processing logics 17 and 23, especially the PPL 23 of the drive subsystem. Such rules induce the port-processing logic 23 to decrypt a received security command and deliver the decrypted security command to the target drive. In one embodiment, this configuration may be done using an IPsec Policies data structure that defines attributes and operation of associated ports. In particular, the IPsec Policies structure is populated with statements/parameters to provide the encryption/decryption. An illustrative example is provided below which is based on the use of strongSwan IPSEC management software. This solution may also minimize configuration changes on the server side, where no IPtables modifications are required.

Below are code examples for the relevant configuration. The first host-host policy is deployed on the storage controller 10 (PPL 17). The second host-host policy is deployed on the drive subsystem 12 (PPL 23) that houses the SED drives 18. Each policy uses traffic selectors (local_ts, remote_ts) to implement the port-identity-based functionality. This example assumes port 4792 as the controller encryption port, which is "local" for the controller rule and "remote" for the drive subsystem rule.

IPSEC POLICIES—(Protect Traffic on a Particular Controller Port)

Controller Rule:

```
host-host {
    local_addrs= %any4
    remote_addrs = %any4
    local {
        auth = pubkey
        certs = ipsec.cert.pem
        id = "C=US, ST=MA, O=Company, CN=Company
        Node XXXyyyyyyyyyy-A"
    }
    remote {
        auth = pubkey
    }
    children {
        local-test {
            local_ts = w.x.y.z1[udp/4792]
            remote_ts = w.x.y.z2
            start_action = start
            #updown = /usr/local/libexec/ipsec/_updown iptables
            esp_proposals = aes256gcm16-prfsha512-ecp521
            mode = transport
        }
    }
    version = 2
    mobike = no
    proposals = aes256gcm16-prfsha512-ecp521
}
```

Drive Subsystem Rule:

```
host-host {
    local_addrs= %any4
    remote_addrs = %any4
```

-continued

```
    local {
        auth = pubkey
        certs = ipsec.cert.pem
        id = "C=US, ST=MA, O=Company, CN=Company
        Node XXXyyyyyyyyyy-B"
    }
    remote {
        auth = pubkey
    }
    children {
        local-test {
            remote_ts = w.x.y.z1[udp/4792]
            local_ts = w.x.y.z2
            start_action = start
            #updown = /usr/local/libexec/ipsec/_updown iptables
            esp_proposals = aes256gcm16-prfsha512-ecp521
            mode = transport
        }
    }
    version = 2
    mobike = no
    proposals = aes256gcm16-prfsha512-ecp521
}
```

Figure 4:
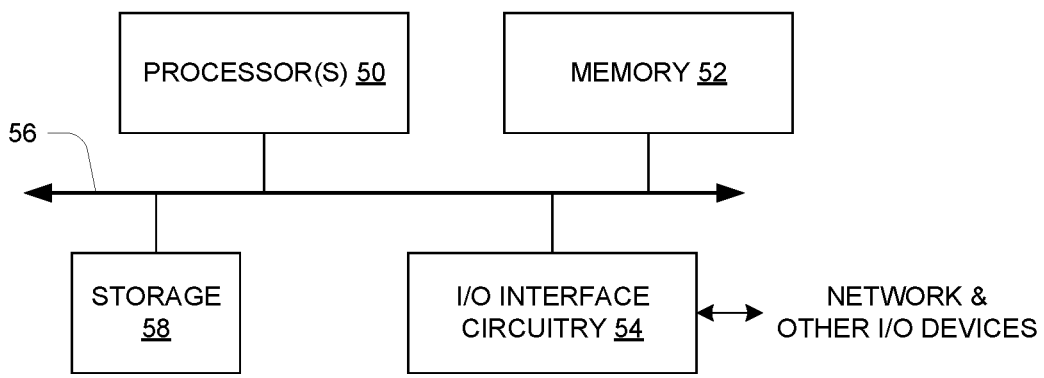
FIG. 4 is a block diagram of a hardware arrangement of a computerized device.

FIG. 4 is a simplified block diagram of a hardware processing arrangement such as may be employed in the storage controller 10 and drive subsystem 12. It includes one or more processors 50, memory 52, and input/output (I/O) interface circuitry 54 coupled together by one or more system interconnects or buses 56. It may also contain local non-volatile secondary storage 58 as shown. In operation, the memory 52 stores computer program instructions and data, where the computer program instructions are executed by the processor(s) 50 to realize software-implemented functionality as described herein. The I/O interface circuitry 54 provides an interface to an external communications network (and perhaps other external I/O devices), enabling the computerized device to communication with other devices reachable by the network (e.g., communications between storage controller 10 and drive subsystem 12 as described herein).

While various embodiments of the invention have been particularly shown and described, it will be understood by those skilled in the art that various changes in form and details may be made therein without departing from the scope of the invention as defined by the appended claims.

What is claimed is:

1. A method by which a drive subsystem engages in data communication with a storage controller, comprising the steps, performed by the drive subsystem, of:
    establishing logic for selectively decrypting data communications from the storage controller based on identification of a controller encryption port as source port in received data communications; and
    receiving and processing the data communications from the storage controller based on identification of source port, by (1) for data commands by which the storage controller stores and retrieves data to/from a target drive of the drive subsystem, receiving the data commands in non-encrypted form and, based on a non-encrypting port being identified as the source port, delivering the received data commands without decryption to the target drive, and (2) for a security command containing secret data enabling operation of the target drive, receiving the security command in encrypted form and, based on the controller encryption port being identified as the source port, decrypting the security command and delivering the decrypted security command to the target drive.

2. The method of claim 1, wherein the target drive is a self-encrypting drive requiring a passphrase to enable operation, and the security command contains the passphrase as the secret data used by the target drive to enable the target drive to store and retrieve data for the storage controller.

3. The method of claim 1, further including, by the drive subsystem, (1) for a security response from the target drive in response to the security command from the storage controller, transmitting the security response to the storage controller with an indication of the controller encrypting port as the target port, and (2) for data responses from the target drive to the storage controller, transmitting the data responses to the storage controller with an indication of the non-encrypting port as the target port, the indications of target port enabling the storage controller to selectively decrypt the security response without also decrypting the data responses.

4. The method of claim 1, wherein the target drive employs hard-coded processing logic requiring that both the security command and the data commands be sent to a single port of the drive subsystem, and wherein the decrypting for the security command is provided by separate port processing logic in response to run-time configuration.

5. The method of claim 1, wherein establishing the logic includes adding an encryption rule to port processing logic, the encryption rule inducing the port processing logic to decrypt the received security command based on the identification of the controller encryption port as the source port.

6. The method of claim 5, wherein the port processing logic utilizes an IPsec policies data structure, and wherein adding the encryption rule includes adding an encryption phrase in the IPsec policies data structure.

7. The method of claim 1, wherein the drive subsystem lacks hardware encryption logic for encrypting communications with the storage controller, and employs software-based encryption logic for decrypting the security command.

8. The method of claim 1, wherein the data communications occur at a transport layer delivering received data communications to a single port of the drive subsystem, the transport layer providing transport-layer encryption for communications sent from the second port of the storage controller, whereby the security command is encrypted at the storage controller and decrypted at the drive subsystem.

9. The method of claim 8, wherein the security command and the data commands are commands of a non-volatile memory access protocol using the transport layer to transport the security command and data commands from the storage controller to the drive subsystem.

10. A drive subsystem including a target drive and port processing logic to engage in data communication with a storage controller, the port processing logic being configured and operative to:
   establish logic for selectively decrypting data communications from the storage controller based on identification of a controller encryption port as source port in received data communications; and
   receive and process the data communications from the storage controller based on identification of source port, by (1) for data commands by which the storage controller stores and retrieves data to/from a target drive of the drive subsystem, receiving the data commands in non-encrypted form and, based on a non-encrypting port being identified as the source port, delivering the received data commands without decryption to the target drive, and (2) for a security command containing secret data enabling operation of the target drive, receiving the security command in encrypted form and, based on the controller encryption port being identified as the source port, decrypting the security command and delivering the decrypted security command to the target drive.

11. The drive subsystem of claim 10, wherein the target drive is a self-encrypting drive requiring a passphrase to enable operation, and the security command contains the passphrase as the secret data used by the target drive to enable the target drive to store and retrieve data for the storage controller.

12. A method by which a storage controller engages in data communication with a drive subsystem, comprising the steps, performed by the storage controller, of:
   establishing a first port and a second port for transmitting data communications to the drive subsystem, the first port being a non-encrypting port configured for transmitting non-encrypted data communications to the drive subsystem, the second port being a controller encryption port configured for encrypting outgoing data communications and transmitting encrypted data communications to the drive subsystem; and
   transmitting the data communications to a destination port of the drive subsystem with selective encryption and identification of source port, by (1) for data commands by which the storage controller stores and retrieves data to/from a target drive of the drive subsystem, transmitting the data commands in non-encrypted form with an indication of the non-encrypting port as the source port, and (2) for a security command containing secret data enabling operation of the target drive, transmitting the security command in encrypted form with an indication of the controller encryption port as the source port.

13. The method of claim 12, wherein the target drive is a self-encrypting drive requiring a passphrase to enable operation, and the security command contains the passphrase as the secret data used by the target drive to enable the target drive to store and retrieve data for the storage controller.

14. The method of claim 12, further including, by the storage controller, (1) for a security response from the target drive in response to the security command from the storage controller, receiving the security response at the second port and decrypting the security response for delivery to a local client, and (2) for data responses from the target drive to the storage controller, receiving the data responses at the first port and delivering the data responses to the local client without decrypting.

15. The method of claim 12, wherein establishing the logic includes adding an encryption rule to port processing logic of the storage controller, the encryption rule inducing the port processing logic to encrypt the security command and transmit the encrypted security command to the drive subsystem with an indication of the controller encrypting port as the source port.

16. The method of claim 15, wherein the port-processing logic utilizes an IPsec policies data structure in connection with the second port, and wherein adding the encryption rule includes adding an encryption phrase in the IPsec policies data structure.

17. The method of claim 12, wherein the data communications occur at a transport layer delivering the data communications to a single port of the drive subsystem, the transport layer providing transport-layer encryption for communications transmitted from the second port of the storage controller, whereby the security command is encrypted at the storage controller and decrypted at the drive subsystem.

18. The method of claim 17, wherein the security command and the data commands are commands of a non-volatile memory access protocol using the transport layer to transport the security command and data commands from the storage controller to the drive subsystem.

19. A storage controller including hardware processing circuitry to engage in data communication with a drive subsystem having a target drive, the processing circuitry being configured and operative to perform a method of:

establishing a first port and a second port for transmitting data communications to the drive subsystem, the first port being a non-encrypting port configured for transmitting non-encrypted data communications to the drive subsystem, the second port being a controller encryption port configured for encrypting outgoing data communications and transmitting encrypted data communications to the drive subsystem; and transmitting the data communications to a destination port of the drive subsystem with selective encryption and identification of source port, by (1) for data commands by which the storage controller stores and retrieves data to/from a target drive of the drive subsystem, transmitting the data commands in non-encrypted form with an indication of the non-encrypting port as the source port, and (2) for a security command containing secret data enabling operation of the target drive, transmitting the security command in encrypted form with an indication of the controller encryption port as the source port.

20. The storage controller of claim 19, wherein the target drive is a self-encrypting drive requiring a passphrase to enable operation, and the security command contains the passphrase as the secret data used by the target drive to enable the target drive to store and retrieve data for the storage controller.

* * * * *